(12) United States Patent
Midorogi (10) Patent No.: US 8,843,537 B2
(45) Date of Patent: Sep. 23, 2014

(54) ELECTRONIC CALCULATOR, DISPLAY METHOD, AND RECORDING MEDIUM FOR DISPLAYING MATHEMATICAL EXPRESSION IN FULL COLOR

(75) Inventor: Satomi Midorogi, Iruma (JP)

(73) Assignee: Casio Computer Co., Ltd., Tokyo (JP)

( * ) Notice: Subject to any disclaimer, the term of this patent is extended or adjusted under 35 U.S.C. 154(b) by 887 days.

(21) Appl. No.: 13/028,422

(22) Filed: Feb. 16, 2011

(65) Prior Publication Data

US 2011/0219051 A1   Sep. 8, 2011

(30) Foreign Application Priority Data

Mar. 5, 2010   (JP) ................................. 2010-048485

(51) Int. Cl.
  *G06F 13/00*   (2006.01)
  *G06F 15/02*   (2006.01)
(52) U.S. Cl.
  CPC ..................................... *G06F 15/02* (2013.01)
  USPC ........................................................ 708/160
(58) Field of Classification Search
  USPC .................................. 708/136, 164, 130, 160
  See application file for complete search history.

(56) References Cited

U.S. PATENT DOCUMENTS

| | | | | |
|---|---|---|---|---|
| 4,467,322 A | * | 8/1984 | Bell et al. | 345/22 |
| 5,844,561 A | * | 12/1998 | Tanimoto et al. | 715/703 |
| 5,901,074 A | * | 5/1999 | Nakano et al. | 708/142 |
| 6,142,367 A | | 11/2000 | Satoh et al. | |
| 7,827,221 B2 | | 11/2010 | Katayama | |
| 2005/0228837 A1 | | 10/2005 | Marostica et al. | |
| 2007/0226283 A1 | | 9/2007 | Uejima | |
| 2009/0075687 A1 | * | 3/2009 | Hino et al. | 455/517 |

FOREIGN PATENT DOCUMENTS

| | | |
|---|---|---|
| JP | 2007-172382 A | 7/2007 |
| JP | 2007-264765 A | 10/2007 |

OTHER PUBLICATIONS

Extended European Search Report (EESR) dated Feb. 6, 2012 (in English)in counterpart European Application No. 11154600.8.
Japanese Office Action dated Nov. 8, 2011 (and English translation thereof) in counterpart Japanese Application No. 2010-048485.

* cited by examiner

*Primary Examiner* — Chuong D Ngo
(74) *Attorney, Agent, or Firm* — Holtz Holtz Goodman & Chick PC (57) ABSTRACT

An electronic calculator makes a display section display an input mathematical expression when receiving an input of the mathematical expression from a user. At that time, a color is given to a component related to a predetermined operation symbol among components of the mathematical expression, and the component is displayed. Also a cursor is displayed in the same color as that of the component to which the cursor belongs. Thus, even when the mathematical expression is displayed in an arithmetic manner, each component of the mathematical expression and a position of the cursor can be easily distinguished from each other.

9 Claims, 7 Drawing Sheets

ELECTRONIC CALCULATOR, DISPLAY METHOD, AND RECORDING MEDIUM FOR DISPLAYING MATHEMATICAL EXPRESSION IN FULL COLOR

BACKGROUND OF THE INVENTION

1. Field of the Invention

The present invention relates to an electronic calculator, display method, and recording medium for displaying a mathematical expression in full color.

2. Description of Related Art

There is conventionally known, as an electronic calculator (electronic desk calculator) which executes calculations of various input mathematical expressions and displays calculation results, a scientific electronic calculator which can perform a calculation using a logarithm function or the like in addition to four arithmetic operations.

In the scientific electronic calculator, formats for displaying the input mathematical expression include a format (linear display format) which displays in line numbers and signs constituting the mathematical expression, and a format (natural display format) which displays the mathematical expression in an arithmetic manner shown in a general textbook, book, and the like. For example, in a case of representing the second power of "a", the linear display format displays "a^2", while the natural display format displays "$a^2$".

In the natural display format, displaying numbers and characters in view of a vertical arrangement is referred to as a 2D (dimension) display, and a function such as root "√", fraction "a/b", or exponential notation "$m^n$" which requires the 2D display is referred to as a 2D function.

There is known Japanese Patent Application Laid-Open No. 2007-264765 as a disclosure of a technique to appropriately control a cursor movement in a mathematical expression in the scientific electronic calculator employing the natural display format.

However, when an exponent of an exponentiation calculation is input in the scientific electronic calculator employing the natural display format, it is difficult to distinguish a display line on which a numeric value (base) to be raised is displayed, from a display line on which the exponent (index) is displayed, if the characters in these display lines are displayed in the same color. In addition, in a case where a radical sign further contains a radical sign like a multiple roots expression and the radical sign and numeric value provided in the inner side and the radical sign and numeric value provided in the outer side are displayed in the same color, or in a case where "×" serving as a multiplication sign is omitted between an integral part and a fraction in a mixed fraction, it is difficult for a user to distinguish each component in the mathematical expression if they are all displayed in the same color. Especially, it is difficult to distinguish where the cursor belongs when the 2D function is used.

SUMMARY OF THE INVENTION

According to a first aspect of the present invention, there is provided an electronic calculator including:

a mathematical expression input section to receive an input of a mathematical expression from a user;

a mathematical expression display control section to display the mathematical expression input from the mathematical expression input section on a display section in an arithmetic manner;

a cursor display control section to display a cursor on the display section in a movable manner according to an operation of the user with respect to the mathematical expression displayed by the mathematical expression display control section;

a mathematical expression color process section to perform a color process for a component related to a predetermined operation symbol among components of the mathematical expression displayed by the mathematical expression display control section; and a cursor color process section to perform a color process for the cursor displayed by the cursor display control section such that the cursor is colored in the same color as a color of the component to which the cursor belongs.

BRIEF DESCRIPTION OF THE DRAWINGS

The present invention will sufficiently be understood by the following detailed description and accompanying drawing, but they are provided for illustration only, and not for limiting the scope of the invention, and wherein.

DETAILED DESCRIPTION OF THE PREFERRED EMBODIMENTS

Hereinafter, the preferred embodiments for implementing the present invention will be described in detail with reference to the accompanying drawing. Here, it is to be noted that the scope of the present invention is not limited to the illustrated example.

1.1 Appearance Configuration

Figure 1:
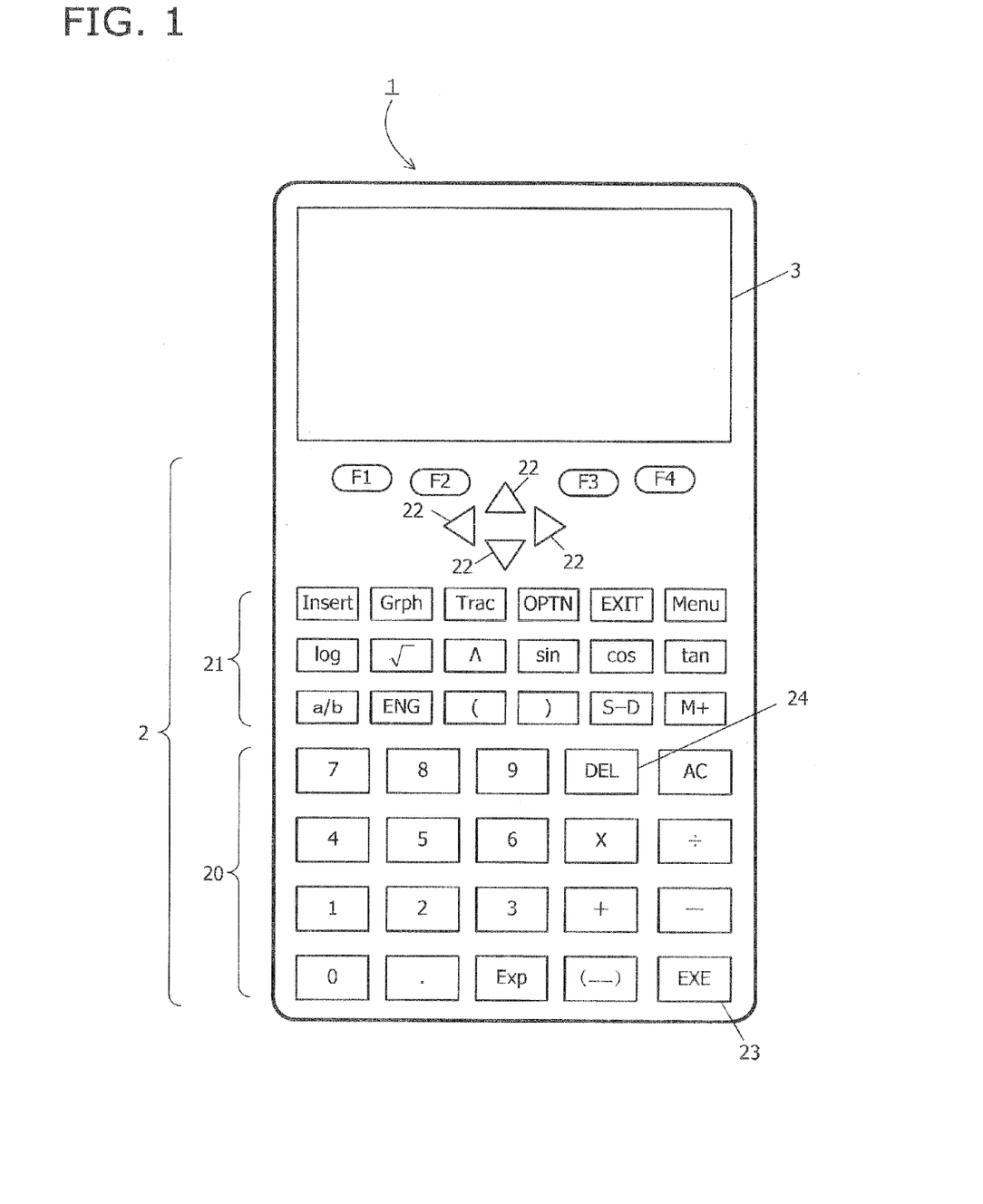
FIG. 1 is a plan diagram showing an appearance configuration of a scientific electronic calculator employing an electronic calculator according to the present invention.

FIG. 1 is a plan diagram showing an appearance configuration of a scientific electronic calculator 1 employing an electronic calculator according to the present invention.

As shown in FIG. 1, the scientific electronic calculator 1 is provided with an input key group 2 having various key groups, and a display 3.

The input key group 2 receives, from a user, an input of a mathematical expression component such as a numeric value or an operation symbol, and instructions of various processes, and has various keys, each of which is assigned with a specific function. According to this embodiment, the input key group 2 includes keys such as a numeric keypad 20, an operation symbol key 21, a cursor key 22, an EXE key 23, and a DEL key 24.

Among them, the numeric keypad 20 receives an input of the numeric value, and the operation symbol key 21 receives inputs of various operation symbols such as symbols of four arithmetic operations, a bracket, a "√" (radical sign) key, a "a/b" (fraction) key, a "^" (exponential notation) key, a logarithm symbol, and a trigonometric function symbol.

The cursor key 22 is pressed to move a cursor showing an edit target position or a selection target position on the display 3 in a predetermined direction, and in this embodiment, the cursor can be moved in four directions such as side to side and up and down.

The EXE key 23 receives an input of an execution instruction or a decision instruction of a process, and after a mathematical expression input is finished for instance, it functions to instruct execution of its calculation process. The DEL key 24 receives an instruction to delete a numeric value or an operation symbol being displayed on the display 3.

The display 3 includes a color-displayable LCD (Liquid Crystal Display) or ELD (Electronic Luminescent Display). The display 3 displays a character, a symbol, a mathematical expression, and a calculation result provided through the operation of the input key group 2, and further displays various pieces of data to be used in the scientific electronic calculator 1. In addition, a touch panel 30 (refer to FIG. 2) is provided integrally over an entire display screen surface of the display 3 in this embodiment.

1.2 Function Configuration

Figure 2:
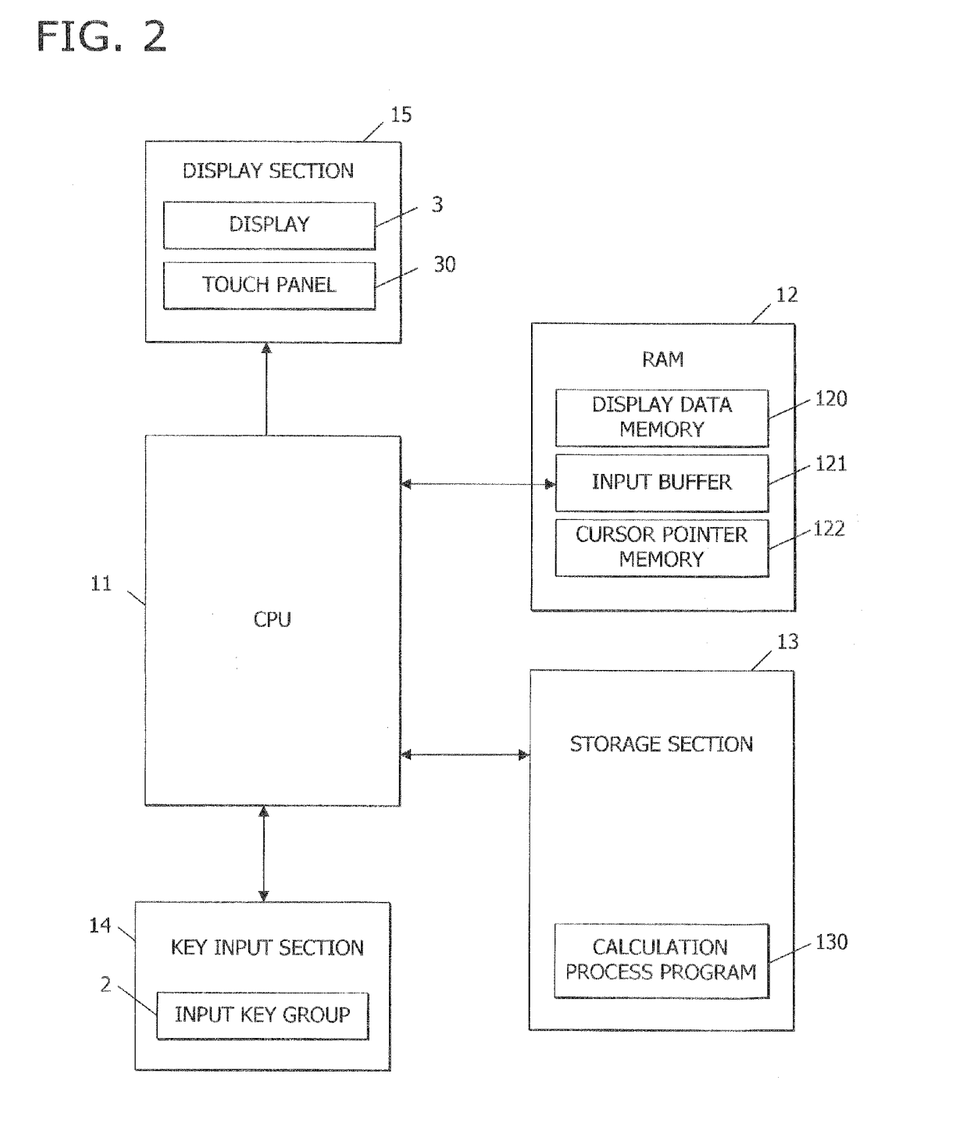
FIG. 2 is a block diagram showing a schematic function configuration of the scientific electronic calculator.

FIG. 2 is a block diagram showing a schematic function configuration of the scientific electronic calculator 1.

As shown in FIG. 2, the scientific electronic calculator 1 includes a key input section 14, a display section 15, a RAM (Random Access Memory) 12, a storage section 13, and a CPU (Central Processing Unit) 11.

The key input section 14 is provided with the abovementioned input key group 2, and outputs an operation signal corresponding to a pressed key, to the CPU 11.

The display section 15 is provided with the abovementioned display 3, and displays various pieces of information on the display 3 based on a display signal from the CPU 11. The display section 15 is further provided with the touch panel 30 which is provided integrally with the display 3, and outputs contact position information of an input pen with respect to the display screen to the CPU 11.

The RAM 12 is a volatile memory to temporarily store information, and has a plurality of work areas to store various programs to be executed and data regarding the various programs. For example, the RAM 12 in this embodiment has a display data memory 120, an input buffer 121, a cursor pointer memory 122, and so on.

In the display data memory 120, data of a mathematical expression and data of a calculation result of the mathematical expression to be displayed on the display section 15 are stored after being expanded into color bitmap data so as to correspond to a display region of the display section 15.

The input buffer 121 sequentially stores data of a key code input through the key input section 14 as shown in a right part in FIG. 6 to be hereinafter described. For example, in a case of an input through the numeric keypad, the data is a code showing a corresponding number, in a case of an input through a function key such as "sin", "cos", "a/b" or "^", the data is a code showing a corresponding function, and in a case of an input through an operation symbol key such as "+", "−", "×", or "÷", the data is a code showing a corresponding operation symbol. The input buffer 121 further stores a control code in addition to the codes corresponding to the keys. For example, among code data shown in FIG. 6, "EZ" is a code showing an end of the mathematical expression. In addition, "("and")" are control codes showing a start and an end of a hierarchy, and show a range of a calculation target of a predetermined operation symbol such as the 2D function.

The cursor pointer memory 122 stores a cursor pointer showing a display position of the cursor, with respect to the key input data in the input buffer 121 (see a triangle mark at a right part in FIG. 6 to be hereinafter described).

In the scientific electronic calculator 1 in this embodiment, when key data of the character, number or symbol is input through the key input section 14, the key data is input correspondingly to the position of the cursor (cursor pointer). When the "DEL" key 24 in the key input section 14 is operated, key data present just before the cursor (cursor pointer) is deleted.

The storage section 13 is a nonvolatile memory composed of a ROM (Read Only Memory) or the like, and stores a calculation process program 130 and various pieces of data for causing the CPU to execute a process such as a mathematical expression color process, a cursor color process, or a calculation process to be hereinafter described.

The CPU 11 centrally controls the respective sections of the scientific electronic calculator 1. More specifically, the CPU 11 expands in the RAM 12 a program designated from a system program and various calculation process programs stored in the storage section 13, and executes various processes in cooperation with the program expanded in the RAM 12.

1.3 Operation of Scientific Electronic Calculator

Next, an operation of the scientific electronic calculator 1 will be described.

Figure 3:
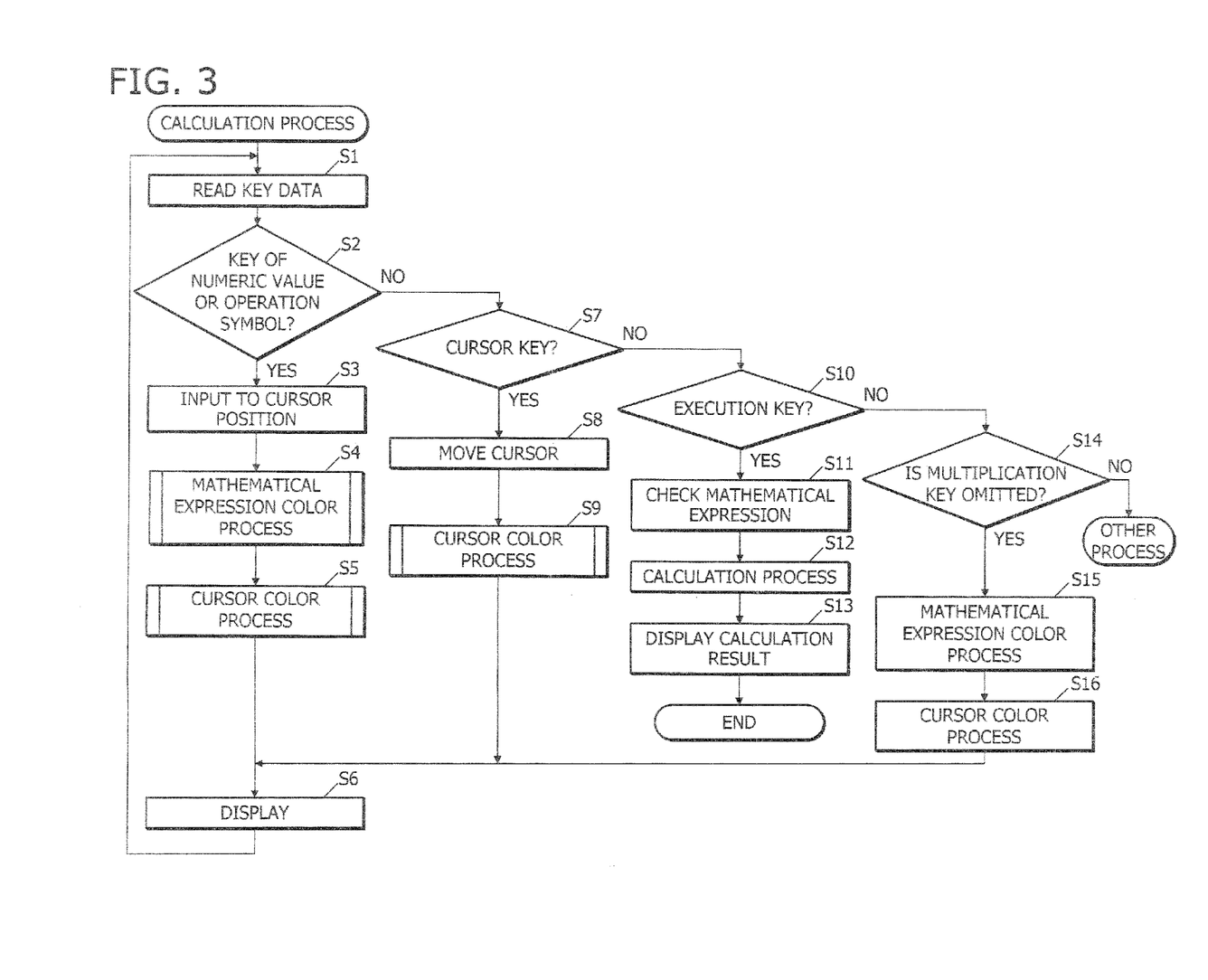
FIG. 3 is a flowchart for explaining an operation of a calculation process.

FIG. 3 is a flowchart for explaining the operation of the calculation process. This calculation process is executed by cooperation between the calculation process program 130 and the CPU 11, when an execution instruction of the calculation process is input by the user through the touch panel 30 or the key input section 14, and after the calculation process program 130 is read from the storage section 14 and appropriately expanded in the RAM 12.

As shown in FIG. 3, in the calculation process, when the user operates one key of the input key group 2, the CPU 11 reads the key data operated by the user (Step S1). Then, it is determined what the read key data is (Steps S2, S7, S10, and S14).

When the read key data is the key of the numeric value or the operation symbol (Step S2: Yes), the key code of the numeric value or the operation symbol is stored at a position corresponding to the cursor position in the input buffer 121 (Step S3), and the mathematical expression color process is performed (Step S4). The mathematical expression color process means a process to display a mathematical expression, which is displayed in black in a normal display, in a color other than black.

Figure 4:
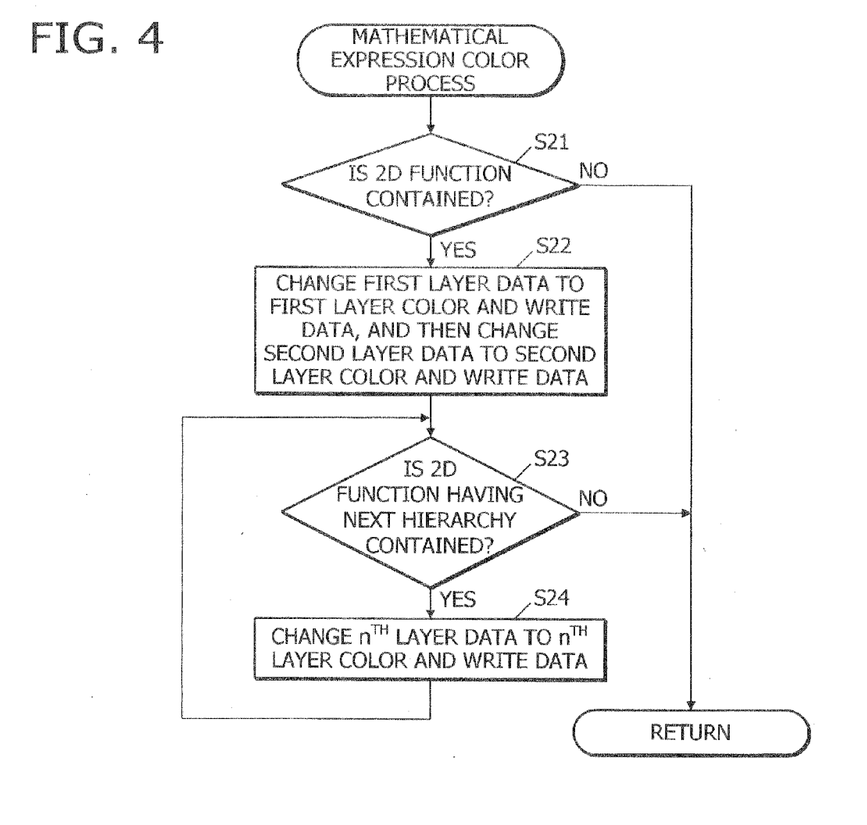
FIG. 4 is a flowchart for explaining an operation of a mathematical expression color process.

FIG. 4 is a flowchart for explaining an operation of the mathematical expression color process.

In the mathematical expression color process, the CPU 11 determines where or not a 2D function having a different hierarchy is contained in the key code data stored in the input buffer 121 (Step S21). Here, it is determined that the 2D function having the different hierarchy is contained, for example in a case where the "^" (exponential notation) key is operated (in a case of exponential mathematical expression), or in a case where the "√" (radical sign) key is operated and then the "√" (radical sign) key is further operated (in a case of a multiple roots expression).

Meanwhile, when it is determined that the 2D function having the hierarchy relationship is not contained (Step S21:

No), the operation is completed without performing the mathematical expression color process.

On the other hand, when it is determined that the 2D function having the hierarchy relationship is contained (Step S21: Yes), display data for displaying key data of a numeric value or an operation symbol of a first layer related to the 2D function in a color of the first layer is written in the display data memory 120 to update the data in the display data memory 120. Then, display data for displaying key data of a numeric value or an operation symbol of a second layer, which is the next hierarchy, in a color of the second layer is written in the display data memory 120 (Step S22). Here, regarding the first layer and the second layer, in the case where the "^" (exponential notation) key is operated, the "^" (exponential notation) key serves as the 2D function, so that the numeric value (base) to be raised is regarded as the first layer, and the numeric value (index) as an exponent is regarded as the second layer. In addition, in the case where the "√" (radical sign) key is operated once and then the "√" (radical sign) key is further operated, the first operated "√" (radical sign) and a value in the radical sign are regarded as the first layer, and the secondly operated "√" (radical sign) and a value in the radical sign are regarded as the second layer.

Then, it is determined whether or not a 2D function having the next hierarchy is contained in the stored key data (Step S23). When it is determined that the 2D function having the next hierarchy is contained (Step S23: Yes), display data for displaying data of a numeric value or an operation symbol of the hierarchy (the $n^{th}$ layer) related to the 2D function in a color of the hierarchy (the $n^{th}$ layer) is stored in the display data memory 120 (Step S24).

The above Steps S23 and S24 are repeated until it is determined that a 2D function having the next hierarchy is not contained in Step S23, and when it is determined that the 2D function having the next hierarchy is not contained (Step S23: No), the mathematical expression color process is completed.

When the mathematical expression color process is completed, the cursor color process is performed (Step S5). The cursor color process means a process performed to display the cursor, which is displayed in black in a normal display, in a color other than black.

Figure 5:
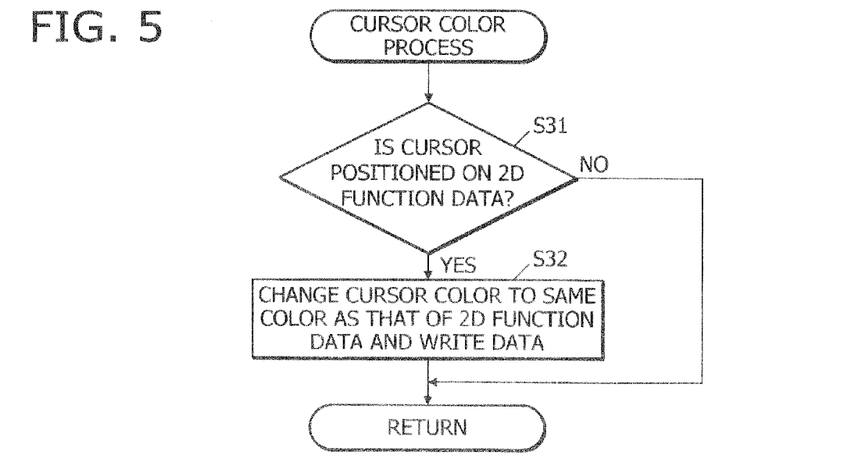
FIG. 5 is a flowchart for explaining an operation of a cursor color process.

FIG. 5 is a flowchart for explaining an operation of the cursor color process.

In the cursor color process, the CPU 11 determines whether or not the cursor is positioned on the 2D function data (Step S31). When the cursor is not positioned on the 2D function data (Step S31: No), the operation is completed without performing the cursor color process. When it is determined that the cursor is positioned on the 2D function data (Step S31: Yes), the color of the cursor is changed so as to become the same color as that of the 2D function data, and stored in the display data memory 120 (Step S32), and the cursor color process is completed. For example, when the cursor is positioned on the first layer data, the color of the cursor is changed so as to become the same color as that of the first layer.

When the cursor color process is completed, the data stored in the display data memory 120 in the mathematical expression color process and the cursor color process are displayed on the display 3 (Step S6).

Meanwhile, when the read key data is the cursor key (Step S7: Yes), the cursor pointer stored in the cursor pointer memory 122 is moved in a direction shown by the input cursor key, and the cursor which is displayed on the display section 15 is moved (Step S8). Then, the cursor color process is performed (Step S9).

The cursor color process in Step S9 is the same as the above-described cursor color process (Steps S31 to S32).

Meanwhile, when the read key data is the execution key (Step S10: Yes), the key code data stored in the input buffer 121 is read and it is checked whether or not it has a problem as the mathematical expression to be the arithmetic target (Step S11). When it is determined that there is a problem that cannot be calculated in a check of the mathematical expression in Step S11, a syntax error is displayed. When there is no problem in the input mathematical expression, the calculation process is executed (Step S12) and data of the calculation result is displayed on the display 3 (Step S13).

When the read key data is the "DEL" key, and it is determined that a "×" (multiplication) key has been deleted (Step S14: Yes), the mathematical expression color process is performed (Step S15).

In the mathematical expression color process in Step S15, data of a numeric value serving as a multiplicand (first block) and data of a numeric value serving as a multiplier (second block) are changed so as to be different in colors from each other, and the numeric value of the first block and the numeric value of the second block whose colors have been changed are stored in the display data memory 120, after which the mathematical expression color process is performed (Step S15).

In the next cursor color process, the cursor color is changed so as to become the same color as that of the first block existing just before the cursor (Step S16). When the cursor color process is completed, the data of the display data memory 120 is displayed on the display 3 (Step S6).

Meanwhile, when the key data read in Step S1 is not determined as the corresponding key in Steps S2, S7, S10, and S14 (Step S14: No), a process corresponding to the read key is appropriately performed.

1.4 Operation Example

Next, the above-described operation of the scientific electronic calculator 1 will be specifically described with reference to the drawings.

FIGS. 6A to 6F are diagrams for explaining a process of the first operation example, in which a display screen of the display is shown in the center, operated keys are shown on the upper side of the display screen, and a change of state of a code data stored in the input buffer 121 associated with the process is shown on the right side of the display screen. The position of the cursor pointer is shown by a triangle mark on the right side of the display screen.

In FIGS. 6A to 6F, and FIGS. 7A to 7E and 8A to 8C described below, mathematical expressions and the like denoted by the reference characters of "K", "R", "B", and "G" are displayed in black, red, blue, and green, respectively. The reference character of "CR" represents the cursor.

First Operation Example

Figure 6A:
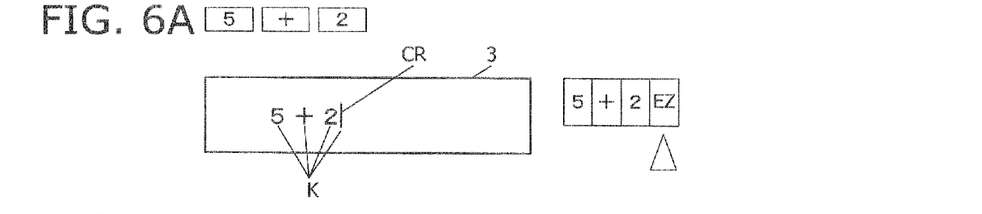
FIGS. 6A to 6F are diagrams for explaining a process of a first operation example.

As shown in FIG. 6A, when the user inputs "5", "+", and "2" through the input key group 2 in order to input a mathematical expression "5+2", the key data is sequentially read (Step S1). When it is determined that the read key data is the key of the numeric value or the operation symbol (Step S2), the key data of "5+2" is stored in the input buffer 121 (Step S3).

In this stage, since the 2D function having the hierarchy relationship is not contained in the stored key data in the mathematical expression color process (Step S4) and the cursor color process (Step S5), the operation is completed without performing the color process.

As a result, the mathematical expression "5+2" and the cursor are displayed in black on the display section 15.

Figure 6B:
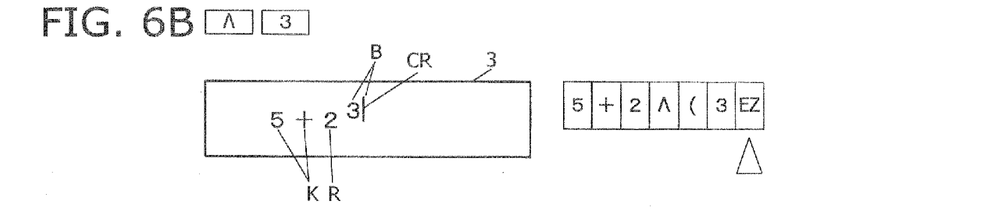

Then, as shown in FIG. 6B, when the user inputs the exponential notation key "^" and the number "3" through the input key group 2, the key data is read (Step S1). When it is determined that the read key data is the key of the numeric value or the operation symbol (Step S2), the key data of "^" and "3" are sequentially stored in the input buffer 121 (Step S3). In addition, when storing "3", the "(" code showing the start of the range of factorial is inserted in front of "3".

In the mathematical expression color process (Step S4) after inputting "3", it is determined that "^ 3" serving as the 2D function is contained in the stored key data (Step S21). Thus, the data "2" of the first layer is displayed in the first layer color (for example, red), and the data "^ 3" of the second layer is displayed in the second layer color (for example, blue) (Step S22). Then, it is determined that the 2D function having a hierarchy relationship next to the second layer is not contained (Step S23), and the mathematical expression color process is completed. When the mathematical expression color process is completed, the cursor color process is performed (Step S5).

In the cursor color process, it is determined that the cursor is positioned on the 2D function data (Step S31), and the cursor is displayed in the same color (blue) as that of data of the second layer to which the cursor belongs (Step S32). As a result, "5+" is displayed in black, "2" is displayed in red, and "3" and the cursor are displayed in blue.

Figure 6C:
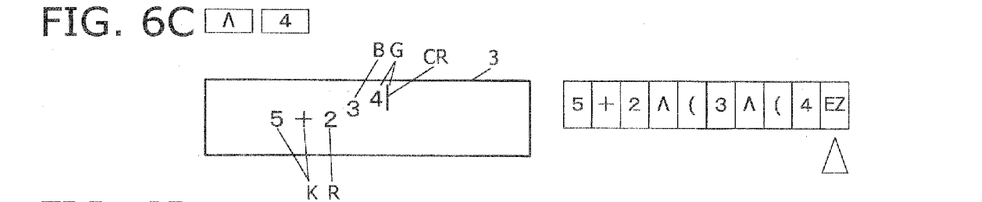

Then, as shown in FIG. 6C, when the user further inputs the exponential notation key "^" and the number "4" by operating the input key group 2, the key data is read (Step S1). Then, it is determined that the read key data is the key of the numeric value or the operation symbol (Step S2), the key data of "^ 4" is stored in the input buffer 121 (Step S3), and the mathematical expression color process is performed (Step S4).

In the mathematical expression color process, it is determined that the "^ 3" and "^ 4" serving as the 2D function are contained in the stored key data (Step S21), and the first layer data "2" is written in the first layer color (for example, red), and the second layer data "^ 3" is written in the second layer color (for example, blue) in the display data memory 120 (Step S22). Then, it is determined that the 2D function having the next hierarchy relationship is contained (Step S23), and the data for displaying the third layer data "^ 4" in a third layer color (for example, green) is stored in the display data memory 120 (Step S24). Then, it is determined that the 2D function having a hierarchy relationship next to the third layer is not contained (Step S23), and the mathematical expression color process is completed. When the mathematical expression color process is completed, the cursor color process is performed (Step S5).

In the cursor color process, it is determined that the cursor is positioned on the 2D function data (Step S31), and the cursor is displayed in the same color (green) as that of data of the third layer to which the cursor belongs (Step S32). As a result, "5+" is displayed in black, "2" is displayed in red, "3" is displayed in blue, and "4" and the cursor are displayed in green on the display section 15.

Figure 6D:
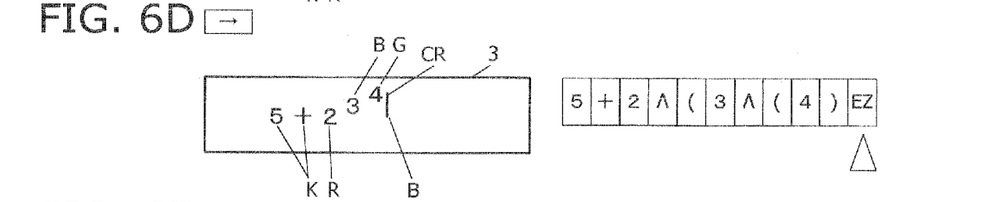

Then, as shown in FIG. 6D, when the user operates the "→" (cursor) key, it is determined that the read key data is the cursor key in Step S7. Thus, since there is no data in the input buffer 121 in the direction corresponding to the input cursor key, the ")" code indicating the end of the third layer of the factorial is inserted, and the cursor is moved to the second layer (Step S8).

In the cursor color process (Step S9), it is determined that the cursor is positioned on the 2D function data (Step S31), the cursor color is changed so as to become the same color (blue) as that of data of the second layer to which the cursor belongs, and the data is stored in the display data memory 120 (Step S32). As a result, "5+" is displayed in black, "2" is displayed in red, "3" and the cursor are displayed in blue, and "4" is displayed in green on the display section 15.

Figure 6E:
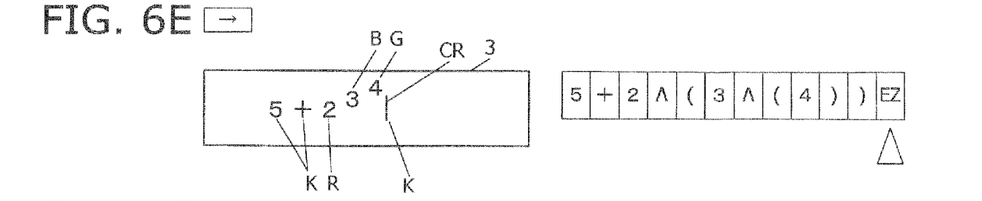

Then, as shown in FIG. 6E, when the user further operates the "→" (cursor) key, similar to FIG. 6D, the ")" code indicating the end of the second layer is inserted, and the cursor is moved to the first layer (Step S8). Then, it is determined that the cursor is not positioned on the 2D function data (Step S31), and the cursor color is changed to the normal color (black), and the cursor is displayed in black.

Figure 6F:
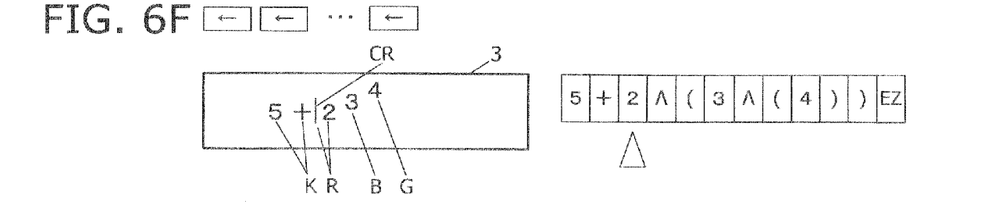

Then, as shown in FIG. 6F, when the user moves the cursor to "2" by operating the "←" (cursor) key several times, the cursor color is changed to the same color (red) as that of the hierarchy of "2" of the 2D function to which the cursor belongs, and the cursor is displayed in red.

Second Operation Example

FIGS. 7A to 7E are diagrams for explaining a process of the second operation example, in which a display screen of the display is shown in the center, and operated keys are shown on the upper side of the display screen. A change of state of code data stored in the input buffer 121 associated with the process is shown on the right side of the display screen. The position of the cursor pointer is shown by a triangle mark on the right side of the display screen.

Figure 7A:
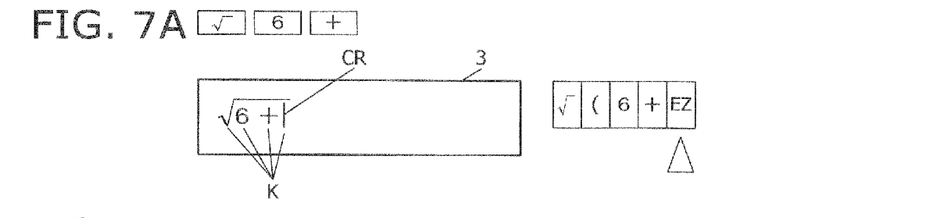
FIGS. 7A to 7E are diagrams for explaining a process of a second operation example.

First, as shown in FIG. 7A, when the user inputs a mathematical expression "√6+", the key data is read (Step S1). It is determined that the read key data is the key of the numeric value or the operation symbol (Step S2), and the key data of "√", "6", and "+" are stored in the input buffer 121 (Step S3). At this time, the code "(" indicating a start of a range of the √ function is inserted in front of "6".

Since it is determined that the 2D function having the hierarchy relationship is not contained in the stored key data (Step S21) in the mathematical expression color process (Step S4), the mathematical expression color process is completed, and the cursor color process is started (Step S5).

In the cursor color process, since it is determined that the cursor is not positioned on the 2D function data (Step S31), the cursor color process is completed. As a result, "√6+" and the cursor are displayed in black on the display section 15.

Figure 7B:
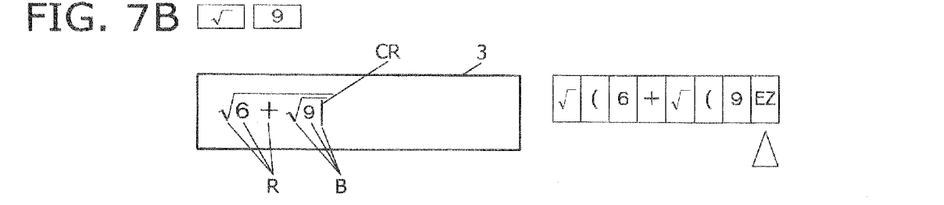

Then, as shown in FIG. 7B, when the user inputs "√" and "9", the key data is read (Step S1), and it is determined that the read key data is the key of the numeric value or the operation symbol (Step S2). The key data "√" and "9" are stored in the input buffer 121 (Step S3). At this time, the code "(" indicating a start of a range of the √ function is inserted in front of "9".

In the mathematical expression color process (Step S4), it is determined that the "√9" serving as the 2D function having the hierarchy relationship is contained in the stored key data (Step S21). The first layer data "√6+" is changed to the first layer color (for example, red), and the second layer data "√9" is displayed in the second layer color (for example, blue). The display data is stored in the display data memory 120 (Step S22).

In the cursor color process (Step S5), it is determined that the cursor is positioned on the 2D function data (Step S31), and the cursor color is changed to the same color (blue) as that of data of the second layer to which the cursor belongs (Step S32). As a result, "√6+" is displayed in red, and "√9" and the cursor are displayed in blue.

Figure 7C:
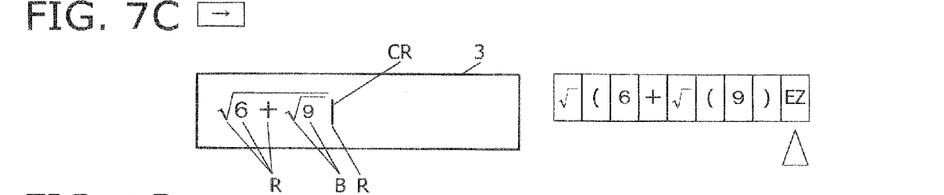

Then, as shown in FIG. 7C, when the user operates the "→" (cursor) key, it is determined in Step 7 that the read key data is the cursor key (Step S7). Since there is no data in the input buffer 121 in the direction corresponding to the input cursor key, the ")" code indicating the end of the second layer of the radical sign is inserted. Here, the cursor is positioned at the first layer of the √ function (Step S8).

In the cursor color process (Step S9), it is determined that the cursor is positioned on the 2D function data (Step S31), and the cursor color is changed to the same color (red) as that of data of the first layer to which the cursor belongs (Step S32). As a result, "√6+" and the cursor are displayed in red, and "√9" is displayed in blue on the display section 15.

Figure 7D:
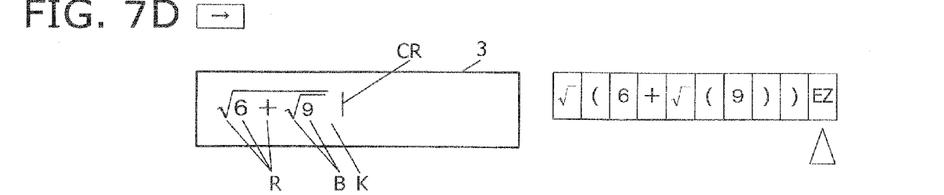

Then, as shown in FIG. 7D, when the user operates the "→" (cursor) key, the read key data is determined as the cursor key (Step S7). Since there is no data in the input buffer 121 in the direction corresponding to the cursor key, the ")" code indicating the end of the first layer of the radical sign is inserted, and the cursor is moved out of the range of the √ function (Step S8). Then, it is determined that the cursor is not positioned on the 2D function data (Step S31), and the cursor is displayed in black on the display section 15.

Figure 7E:
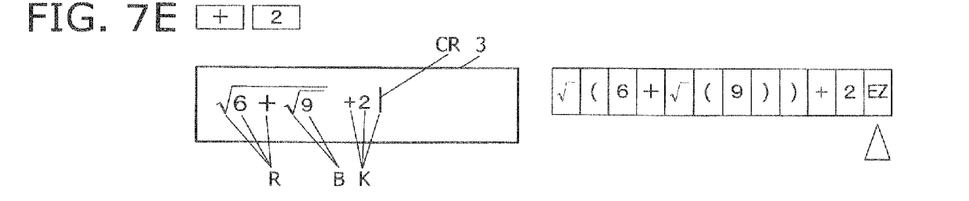

Then, as shown in FIG. 7E, when the user operates the "+" key and the "2" key, the key data is read (Step S1), it is determined that the read key data is the key of the numeric value or the operation symbol (Step S2), and the key data "+" and "2" are stored in the input buffer 121 (Step S3).

In this case, in the mathematical expression color process (Step S4), the color process is performed for the 2D function in the stored key data, and in the cursor color process (Step S5), it is determined that the cursor is not positioned on the 2D function data, so that the color process to change the color of the cursor to another color is not performed.

Therefore, the first layer data "√6+" is displayed in the first layer color (red), the second layer data "√9" is displayed in the second layer color (blue), and the "+ 2" and the cursor are displayed in black on the display section 15.

Third Operation Example

Figure 8A:
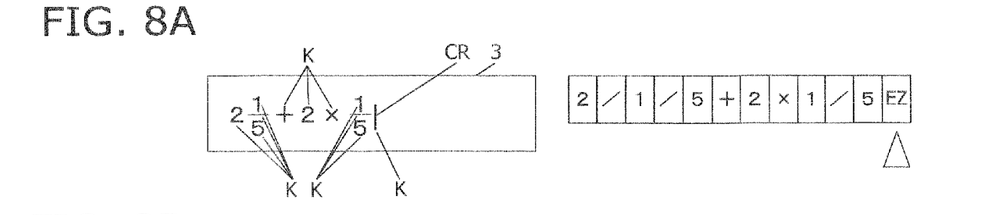
FIGS. 8A to 8C are diagrams for explaining a process of a third operation example.
Figure 8B:
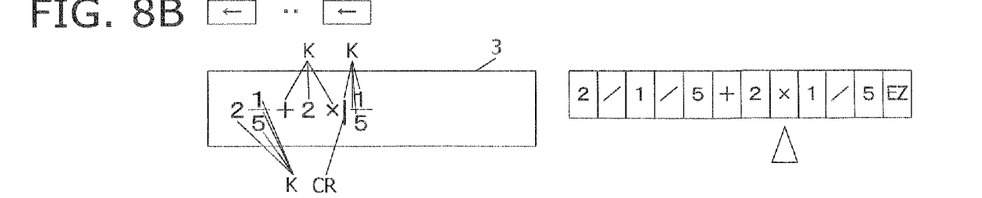
Figure 8C:
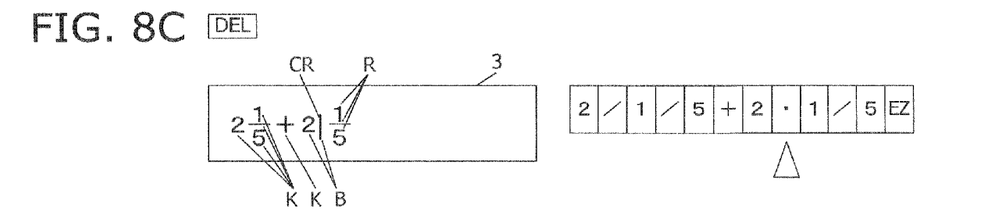

FIGS. 8A to 8C are diagrams for explaining a process of the third operation example.

First, as shown in FIG. 8A, when the user inputs a fractional calculation formula "2/⅕+2×⅕", the key data is read (Step S1), and it is determined that the read key data is the key of the numeric value or the operation symbol (Step S2). Then, the key data of "2/⅕+2×⅕" is stored in the input buffer 121 (Step S3).

In the mathematical expression color process (Step S4), it is determined that the 2D function having the hierarchy relationship is not contained in the stored key data (Step S21).

In the cursor color process (Step S5), it is determined that the cursor is not positioned on the 2D function data (Step S31). Therefore, the fractional expression is displayed in black as a natural display on the display section 15 as shown in FIG. 8A.

Then, as shown in FIG. 8B, when the user operates the "←" (cursor) key to move the cursor to between "×" and "⅕" (Step S8), and further operates the "DEL" (delete) key as shown in FIG. 8C, it is determined in Step S14 that "×" (multiplication) key is omitted.

In the mathematical expression color process (Step S15), the key data "2" serving as a multiplicand and "⅕" serving as a multiplier are changed to be different in colors such as blue and red.

In the cursor color process (Step S16), the cursor color is changed to become the same blue as that of "2" positioned just before the cursor. Thus, the cursor is displayed in blue on the display section 15 (Step S6).

As described above, according to this embodiment, among the components input as the mathematical expression by the user and displayed in a natural display on the display section 15, the 2D function having the hierarchy relationship, and the component related to the 2D function are displayed in the different colors, so that the numeric value (base) to be raised and the exponent (index) can be easily distinguished in the exponential mathematical expression. In addition, when the radical sign is further provided in the radical sign, the position of the mathematical expression component which is hard to be distinguished in the natural display can be easily distinguished.

In addition, since the cursor is displayed in the same color as that of the component to which the cursor belongs, the cursor position can be easily distinguished.

Moreover, as described in the third operation example, even when the "×" (multiplication) key is omitted, the key just before the "×" key and the key just after the "×" key are displayed in the different colors, so that the omission of the multiplication key can be easily distinguished.

As for a detailed configuration and a detailed operation of each component of the scientific electronic calculator 1 in this embodiment, they may be appropriately modified without departing from the scope of the present invention as a matter of course.

For example, while the electronic calculator according to the present invention has been described as the scientific electronic calculator 1, the present invention is not limited to that product and can be applied to a general electronic device such as a mobile phone, personal computer, PDA (Personal Digital Assistant), or game machine. In addition, the calculation process program 130 according to the present invention may be stored in a memory card, a CD, or the like which is removable from the electronic calculator.

While the mathematical expression is input by the user through the input key group 2 in Step S1, it may be input through the touch panel 30.

Furthermore, while the "×" key is omitted in the "integral number×fraction" in the third operation example, the same process is performed when the "×" key is omitted in "variable×variable" or "variable×Sin".

All of the disclosures including the patent specification, the claims, the attached drawings and the abstract of Japanese Patent Application No. 2010-048485 filed on 5 Mar. 2010 are herein incorporated by reference.

Although various typical embodiments have been shown and described, the present invention is not limited to those embodiments. Consequently, the scope of the present invention can be limited only by the following claims.

What is claimed is:

1. An electronic calculator comprising:
   a mathematical expression input section which receives an input of a mathematical expression from a user;
   a mathematical expression display control section which displays the mathematical expression input from the mathematical expression input section on a display section in an arithmetic manner;
   a cursor display control section which displays a cursor on the display section in a movable manner according to an operation of the user with respect to the mathematical expression displayed by the mathematical expression display control section;
   a mathematical expression color process section which performs a color process to respectively give predetermined different colors to components being nested in a term and having different hierarchies in the mathematical expression displayed by the mathematical expression display control section; and a cursor color process section which, when the cursor is moved over the mathematical expression displayed in the arithmetic manner, performs a color process to give to the cursor displayed by the cursor display control section, a color from among the predetermined different colors which is given to a component having a hierarchy to which the cursor currently belongs.

2. The electronic calculator according to claim 1, wherein the mathematical expression including the components having the different hierarchies is an exponential mathematical expression, and the mathematical expression color process section gives the different colors respectively to a base and an exponent in the exponential mathematical expression.

3. The electronic calculator according to claim 1, wherein the mathematical expression including the components having the different hierarchies is a multiple roots expression, and the mathematical expression color process section gives the different colors respectively to a first radical and a second radical nested in the first radical in the multiple roots expression.

4. A display method in an electronic calculator, comprising:

receiving an input of a mathematical expression from a user;

displaying the input mathematical expression on a display section of the calculator in an arithmetic manner;

displaying a cursor on the display section in a movable manner according to an operation of the user with respect to the displayed mathematical expression;

performing a color process to respectively give predetermined different colors to components being nested in a term and having different hierarchies in the displayed mathematical expression; and when the cursor is moved over the mathematical expression displayed in the arithmetic manner, performing a color process to give to the displayed cursor, a color from among the predetermined different colors which is given to a component having a hierarchy to which the cursor currently belongs.

5. The method according to claim 4, wherein the mathematical expression including the components having the different hierarchies is an exponential mathematical expression, and wherein the color process for the components of the mathematical expression gives the different colors respectively to a base and an exponent in the exponential mathematical expression.

6. The method according to claim 4, wherein the mathematical expression including the components having the different hierarchies is a multiple roots expression, and wherein the color process for the components of the mathematical expression gives the different colors respectively to a first radical and a second radical nested in the first radical in the multiple roots expression.

7. A non-transitory computer readable recording medium having recorded thereon a program for an electronic calculator, wherein the program causes a computer of the electronic calculator to perform functions comprising:

receiving an input of a mathematical expression from a user;

displaying the input mathematical expression on a display section of the calculator in an arithmetic manner;

displaying a cursor on the display section in a movable manner according to an operation of the user with respect to the displayed mathematical expression;

performing a color process to respectively give predetermined different colors to components being nested in a term and having different hierarchies in the displayed mathematical expression; and when the cursor is moved over the mathematical expression displayed in the arithmetic manner, performing a color process to give to the displayed cursor, a color from among the predetermined different colors which is given to a component having a hierarchy to which the cursor currently belongs.

8. The non-transitory computer readable recording medium according to claim 7, wherein the mathematical expression including the components having the different hierarchies is an exponential mathematical expression, and wherein the color process for the components of the mathematical expression gives the different colors respectively to a base and an exponent in the exponential mathematical expression.

9. The non-transitory recording medium according to claim 7, wherein the mathematical expression including the components having the different hierarchies is a multiple roots expression, and wherein the color process for the components of the mathematical expression gives the different colors respectively to a first radical and a second radical nested in the first radical in the multiple roots expression.

* * * * *